United States Patent Office 3,477,092
Patented Nov. 11, 1969

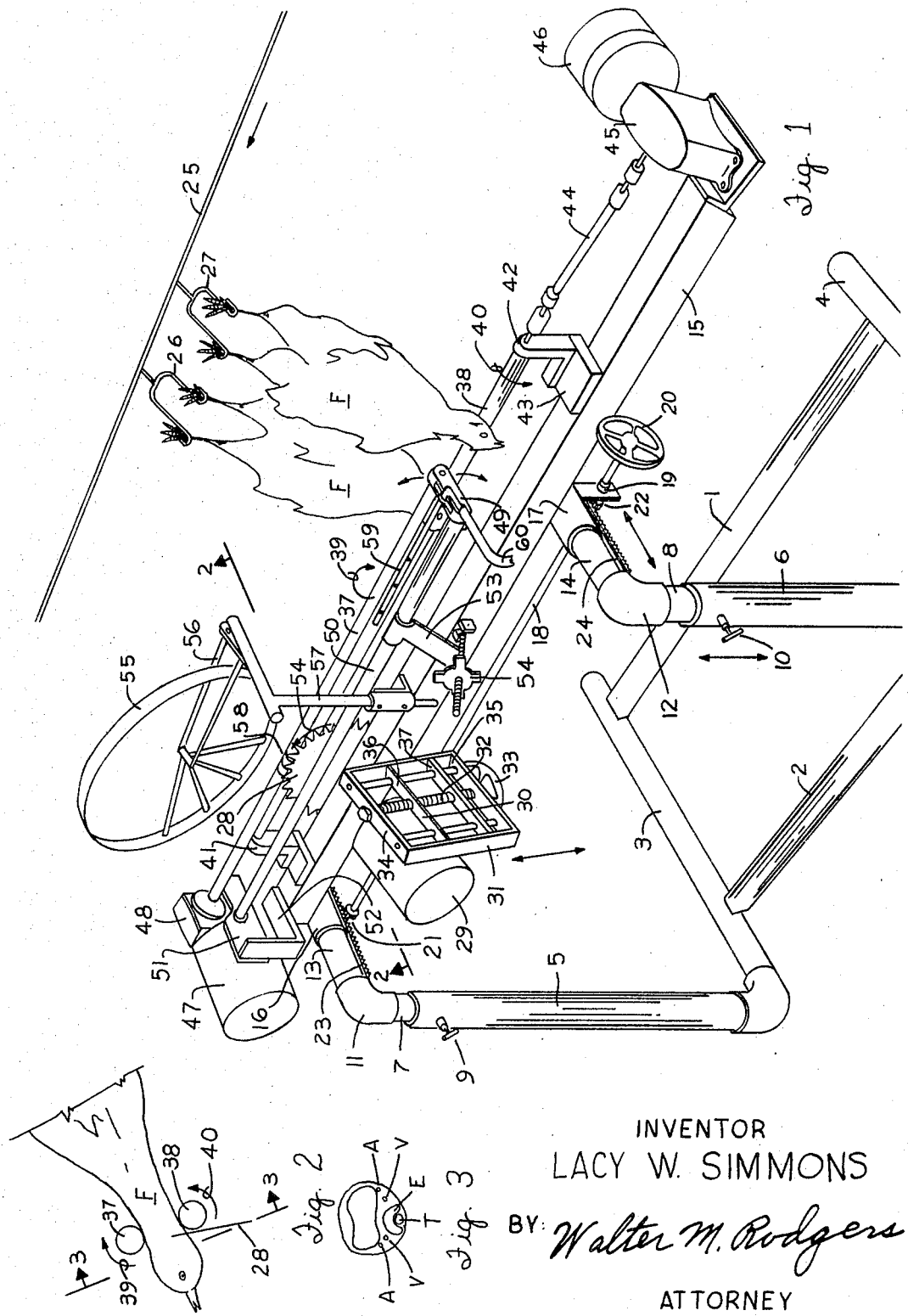
INVENTOR
LACY W. SIMMONS
BY Walter M. Rodgers
ATTORNEY

3,477,092
FOWL KILLING MACHINE AND METHOD
Lacy W. Simmons, P.O. Box 6205, Station A,
Marietta, Ga. 30060
Filed May 29, 1967, Ser. No. 641,810
Int. Cl. A22b 3/08; A22c 21/00
U.S. Cl. 17—11       10 Claims

ABSTRACT OF THE DISCLOSURE

A fowl killing machine having conveyor means for moving the fowl head down along a predetermined path for engagement by a rotatable disc having a serrated cutting edge is provided with positioning means in the form of a pair of spaced rollers rotating in opposite directions for receiving the necks of the fowl therebetween and for guiding the necks into engagement with the serrated cutter means. The predetermined path along which the fowl are moved by the conveyor means is parallel to the axes of the spaced rollers and the cutter element is arranged so that when it engages the neck of a fowl it causes rotation thereof in such manner as to result in the severing of both the jugular vein and carotid artery located on one side of the neck of the fowl.

---

According to this invention a fowl killing machine and method are provided wherein a fowl is moved along a predetermined path by conveyor means and into eventual contact with cutter means and wherein positioning means is engageable with the neck of the fowl and arranged so as to orient the fowl neck in a predetermined fashion relative to the cutter means. When the neck of the fowl engages the cutter means rotation of the cutter means causes limited rotation of the neck of the fowl so as to expose one side of the neck along with the jugular vein and carotid artery for cutting by the cutter means. Cutting is such as to cause fatal bleeding but does not sever the neck completely.

For a better understanding of the invention, reference may be had to the following detailed description taken in conjunction with the accompanying drawing in which FIG. 1 is a perspective view of a machine constructed according to the invention; FIG. 2 is a schematic view taken generally along the line designated 2—2 in FIG. 1 and which shows the general orientation but not the details of certain parts of the machine of FIG. 1 in relation to the neck of a fowl being butchered; and in which FIG. 3 is a schematic generalized sectional view of the neck of a fowl taken approximately along the line designated 3—3 in FIG. 2 and which shows the jugular veins, the carotid arteries, the esophagus and the trachea in approximately their correct orientation.

With reference to the drawing, the numerals 1 and 2 designate horizontally disposed base portions to the ends of which a pair of horizontally disposed base elements 3 and 4 are affixed. Secured to the left hand ends of base elements 3 and 4 are two upright pedestals 5 and 6. Vertically adjustable telescopic elements 7 and 8 are disposed within the upper ends of pedestals 5 and 6 and are secured at a predetermined height by manually adjustable set screws 9 and 10. Elbows 11 and 12 are affixed to the upper ends of telescopic elements 7 and 8 and horizontally disposed tubular elements 13 and 14 are secured to the elbows 11 and 12 respectively.

The basic element of the machine proper is designated by the numeral 15 and preferably comprises an inverted channel to the lower surface of which a pair of horizontally disposed cylindrical elements 16 and 17 are affixed. Elements 16 and 17 are telescopically related to the horizontally disposed tubular elements 13 and 14 respectively.

For the purpose of adjusting the machine in a sidewise direction, a rotatable rod 18 is journaled in an aperture formed in a stud 19 affixed to telescopic element 17 at one end and at the other the rod 18 is journaled in a stud similar to stud 19 which is affixed to horizontally disposed telescopic element 16. Rod 18 is rotated by a manually operable adjusting wheel 20 and is provided with a pair of pinions 21 and 22 which are securely affixed thereto and rotatable therewith. Pinions 21 and 22 cooperate with racks 23 and 24 respectively which in turn are fixed in position to elbows 12 or to horizontally disposed tubular elements 13 and 14. Thus rotation of manually operable element 20 imparts movement to the channel 15 and to parts of the machine mounted thereon in a sidewise direction as will be obvious from FIG. 1.

In order to convey the fowl "F" into the machine for butchering, conveyor means in the form of schematically depicted endless chain 25 is employed. The lower reach only of conveyor means 25 is shown in the drawing and as is well understood in the art brackets such as are depicted at 26 and 27 are provided with fastening means for engaging the legs of the fowl as is clearly shown in FIG. 1.

The necks of the fowl are engaged in sequence by a rotatable cutter disc 28 rotatably mounted on the shaft (not shown) of motor 29. As is well known, rotatable disc 28 may be provided with serrations about its periphery and in effect constitutes a device similar to a rotatable saw. Cutter means 28 and its associated driving motor 29 are mounted on frame structure 30 which is movable relative to a cooperating frame structure 31 secured to the base 15 by welding or other suitable means. Relative movement between frames 30 and 31 is achieved by exteriorly threaded rotatable element 32 which is manually operable by adjustment wheel 33. Thus with the ends of threaded element 32 journaled in the upper plate 34 of frame 31 and in the lower plate 35 thereof and with the plates 36 and 37 of frame 30 provided with internal threads at the apertures through these plates in which the threaded element 32 is disposed, rotation of element 32 imparts motion to the frame 30, motor 29 and to cutter 28 relative to base 15.

For the purpose of properly positioning the necks of the fowl "F" relative to the cutter means 28 and in accordance with this invention, positioning means in the form of a pair of rollers 37 and 38 are provided and are rotated in opposite directions as indicated by the arrows 39 and 40.

Roller 38 is journally mounted at its left hand end in a pedestal 41 affixed to channel 15. At its right hand end roller 38 is rotatably mounted in a pedestal 42 affixed to block 43 which in turn is secured atop channel 15. Rotatable roller 38 is rotated by flexible drive means 44 which is driven from a gear box 45 which in turn is operated by motor 46.

The other rotatable roller 37 is rotated by motor 47 and its associated gear box 48. Gear box 48 also constitutes a journal-like support for the left hand end of rotatable roller 37. The right hand of roller 37 is journalled in a horizontally disposed support element 49 the left hand end of which is secured to a support rod 50 held in place by support means 51 at its left hand end which in turn is affixed by L-shaped element 52 to the channel 15. Near the right hand end of rod 50, additional support is provided in the form of a bracket 53 which is adjustable by threaded element 54 relative to the base 15. In order to raise the upper roller 37, the rotatable element 54 is rotated manually in a clockwise direction and moves downwardly on the threaded element on which it is mounted. This movement swings the bracket 53 downwardly and twists the support bar 50 against the inherent resilience thereof. In order to lower the roller 37, the element 54 is rotated counterclockwise and the inherent torsion action of bar 50 swings bracket 53 upwardly in following relation to adjustable element 54 and in turn pivots the roller downwardly about rod 50 as a center.

Thus with the fowl F moving along a predetermined path as established by the lower reach of conveyor means 25, their necks are captured in the space between the rollers 37 and 38. Rotation of these rollers in opposite directions as indicated by the arrows 39 and 40 tends to retain the necks of the birds securely between the rolls and in accordance with a feature of the invention, the spacing between these rollers is such that the jaws of each bird lie flat against the lower roller 38 so that the necks are held in a predetermined orientation as depicted in FIG. 1 for example by friction between the rollers and the necks and jaws of the birds. As the neck of a bird engages the cutter means 28, a rotating or neck twisting operation is performed. This twisting or rotation of necks of the fowl is for the purpose of shifting the necks to one side so as to expose the jugular veing and carotid artery on one side of the neck for cutting by cutter means 28.

As is apparent from FIG. 3, the carotid arteries on each side of the neck are indicated by the letters A while the jugular veins on each side of the neck are indicated by the letters V. The esophagus is indicated by the letter E and the trachea is designated by the letter T. Of course the jaws of the birds are located in the region adjacent the jugular vein V. Thus with the cutter means 28 rotating in a counterclockwise direction as viewed in FIG. 1 and as indicated by the arrow 54, the neck of a bird is rotated generally clockwise as viewed in FIGS. 1 and 3, due to the fact that the peripheral portion of cutter means 28 which comes in contact with the necks of the birds is moving in the same general direction tangentially as is the direction of movement of the fowl F along the predetermined path. This motion exposes the bird's left hand vein and artery. For machines of reversed orientation the right vein and artery is cut.

Thus according to a principal feature of the invention the artery and vein on one side of the neck are severed due to the fact that the positioning means in the form of rollers 37 and 38 effectively guides and holds the neck of the birds in precisely the correct position to effect this operation. Of course gravity tends also to urge the heavy breast part downwardly and aids in properly orienting the body of the bird and facilitates the action of the rolls. For some applications of the invention when the cutter is driven at high speeds, the trachea, esophagus, and both veins and arteries can be cut. A principal advantage which is attributable to the novel positioning means in the form of the rollers 37 and 38 according to this invention centers around the fact that the line speed of conveyor 25 may be varied substantially over a wide range of variations without any adjustment in the parts. Stated otherwise, the conveyor 25 need not be synchronized with any of the other elements of the machine and in this manner production requirements of a highly variable nature may be accommodated according to one aspect of the invention. Furthermore, the fact that the jaws of the fowl are held snugly against the lower roller as a particular bird approaches the cutter is achieved by the oppositely rotating rollers 37 and 38 in conjunction with the laterally offset relation of the conveyor 25 so that the weight of each bird tends to maintain proper tension both before and during a cutting operation. Thus the operator or automatic feed device as the case may be need not be concerned with or be adapted to provide for the positioning or orientation of the head and neck so long as the correct side of the bird such as the right side or leg is in leading relation on the conveyor 25.

As already explained, the rotary cutting element tends to twist the head of the bird and at high speeds cuts completely across the throat of the bird so as to sever both jugular veins and both carotid arteries. During this cutting operation, the weight of the bird maintains tension against the holding friction of the rollers which tends to stretch the neck of the bird. It is for reasons such as are set forth above which account for some of the advantages attributable to the novel positioning rollers 37 and 38.

Of course such a cutting operation results in thorough and complete bleeding of the butchered fowl and eliminates the undesired red appearance which results due to incomplete bleeding.

In order to urge the body of a large bird away from the rolls, an idler brush 55 is rotatably mounted on a support structure 56 which in turn is affixed by bracket 57 to the channel 15 by any suitable means. The idler brush 55 is not driven but simply is positioned so as to rotate as the fowl pass underneath and adjacent thereto. Of course the idler 55 is effective due to the fact that both the feet and neck of the birds are under positive control throughout the butchering operation according to this invention. For this reason, the bodies of the birds are disposed immediately adjacent to the idler brush 55 and hence are effectively controlled thereby in accordance with a facet of the invention.

Instead of the rotatable brush a fixed low friction flexible rod or guide could be used, if desired.

It should be pointed out that the cutter 28 must operate as described and that if it were rotated in the opposite direction the butchering operation would be impeded and interrupted due to a jamming action.

For the purpose of impeding the sliding movement of a bird's head linearly along the roller 37 adjacent the cutter 28 and thereby to facilitate rotation of the head, one or more impedance rings 58 may be provided on roller 37. These rings could constitute peripheral grooves or upraised elements.

In order to clean and if need be to minimize the friction of the rolls it may be desirable to mount fluid applying means adjacent the rollers 37 and 38. Such means as shown could comprise a perforated tube 59 to which fluid such as water is supplied under pressure through a conduit 60 from a reservoir not shown.

The embodiments of the invention in which an exclusive property or privilege is claimed are defined as follows:

1. A fowl killing machine comprising conveyor means for moving the fowl along a predetermined path, a pair of parallel spaced driven rollers disposed in parallel relationship to said path and arranged to receive therebetween the neck and jaws of the fowl and operable by friction between the rollers and the necks of the fowl to urge the jaws and neck in a direction generally away from said conveyor means, said conveyor means being displaced laterally from said rollers so that the weight of a fowl tends to maintain tension on the neck of the fowl during movement by said conveyor means and during a cutting and twisting action by said cutter, the spacing between the rollers being such that the jaws of the fowl are held against one roller so as to hold the neck and jaws against substantial rotation as the fowl is moved by said conveyor means, and movable cutter means disposed adjacent said positioning means and engageable with the neck of the fowl for severing preselected vascular parts therein, said cutter means being movable in a fixed relation to said rollers and the spacing and orientation of said cutter relative to said rollers being such as to preclude decapitation of the fowl.

2. A machine according to claim 1 wherein said cutter means comprises a rotatable generally circular cutter having serrations about its periphery and wherein movement of the part of said cutter which is in contact with the neck of a fowl in a generally tangential direction is generally the same direction as that of said predetermined path.

3. A machine according to claim 1 wherein the part of the cutter which engages the fowl neck is movable relative to the fowl neck so that the head and neck of the fowl are rotated and twisted through an angle sufficient to expose an artery and vein on one side of the neck to cutting action by said cutter means in coordination with engagement of said cutting means by the neck of a fowl.

4. A method of killing fowl comprising the steps of moving the fowl along a predetermined path, holding the neck and jaws of the fowl in a predetermined orientation so as to prevent substantial rotation thereof while the fowl is moved along said predetermined path, rotating and twisting the neck and jaws while cutting sufficiently into the neck to cause fatal bleeding but without decapitating the fowl.

5. A method according to claim 4 wherein the neck is rotated and twisted sufficiently to expose at least one artery and one vein on one side of the neck for cutting.

6. A fowl killing machine comprising conveyor means for moving the fowl along a predetermined path, positioning means engageable with the neck and the jaws of the fowl and arranged to hold the neck and jaws in a predetermined orientation as the fowl is moved by said conveyor means, cutter means disposed adjacent said positioning means and engageable with the neck of the fowl for severing preselected vascular parts therein, and an idler brush disposed adjacent said positioning means and engageable with the body of the fowl so as to aid in proper orientation thereof.

7. A fowl killing machine comprising conveyor means for moving the fowl along a predetermined path, positioning means engageable with the neck and jaws of the fowl and arranged to hold the neck and jaws in a predetermined orientation as the fowl is moved by said conveyor means, cutter means disposed adjacent said positioning means and engageable with the neck of the fowl for severing preselected vascular parts therein, and an idler brush disposed adjacent said positioning means and engageable with the body of the fowl so as to aid in proper orientation thereof, said idler brush comprising a freely rotatable element for engaging and brushing the body of the fowl in a downward and transverse direction.

8. A fowl killing machine comprising conveyor means for moving the fowl along a predetermined path, positioning means engageable with the neck and jaws of the fowl and arranged to hold the neck and jaws in a predetermined orientation as the fowl is moved by said conveyor means, cutter means disposed adjacent said positioning means and engageable with the neck of the fowl for severing preselected vascular parts therein, and fluid applying means disposed adjacent said positioning means and operable to apply a quantity of cleaning and lubricating fluid thereto.

9. A machine according to claim 1 wherein at least one of said rollers is provided with impedance means affixed thereto and movable therewith for increasing the friction thereof in a linear direction but not appreciably in a peripheral direction.

10. A machine according to claim 1 wherein at least one impedance ring is formed about the periphery of at least one of said rollers and secured thereto and adjacent said cutter to facilitate rotation of the head of a fowl by said cutter.

References Cited
UNITED STATES PATENTS

| | | | |
|---|---|---|---|
| 2,129,968 | 9/1938 | Sargent et al. | 17—11 |
| 2,210,377 | 8/1940 | Onorato et al. | 17—11 |
| 3,017,660 | 1/1962 | Reeves | 17—12 |

LUCIE H. LAUDENSLAGER, Primary Examiner

U.S. Cl. X.R.

17—45